United States Patent
Krutz et al.

[11] Patent Number: 6,138,012
[45] Date of Patent: *Oct. 24, 2000

[54] METHOD AND APPARATUS FOR REDUCING SIGNAL BLOCKING IN A SATELLITE COMMUNICATION SYSTEM

[75] Inventors: Michael William Krutz, Chandler; James Powers Redden, Mesa; Daniel Richard Tayloe, Phoenix, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/905,623

[22] Filed: Aug. 4, 1997

[51] Int. Cl.[7] .................. H04Q 7/20; H04B 7/00
[52] U.S. Cl. ............... 455/427; 455/504; 455/450; 455/552; 455/272
[58] Field of Search .................. 455/12.1, 13.1, 455/13.2, 427, 450, 503, 504, 505, 506, 552, 553, 272, 273; 370/320, 321

[56] References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |
| 5,161,248 | 11/1992 | Bertiger et al. | 455/17 |
| 5,446,922 | 8/1995 | Siwiak et al. | 455/277.2 |
| 5,485,485 | 1/1996 | Briskman et al. | 455/13.2 |
| 5,537,679 | 7/1996 | Crosbie et al. | 455/132 |
| 5,539,730 | 7/1996 | Dent | 370/280 |
| 5,561,673 | 10/1996 | Takai et al. | 455/277.2 |
| 5,590,395 | 12/1996 | Diekelman | 455/13.1 |
| 5,592,481 | 1/1997 | Wiedeman et al. | 455/12.1 |
| 5,608,722 | 3/1997 | Miller | 370/320 |
| 5,664,006 | 9/1997 | Monte et al. | 455/405 |
| 5,768,684 | 3/1994 | Grubb et al. | 455/13.4 |
| 5,839,053 | 7/1996 | Bosch et al. | 455/13.1 |
| 5,841,766 | 12/1994 | Dent et al. | 370/321 |
| 5,867,789 | 12/1996 | Olds et al. | 455/453 |
| 5,898,928 | 2/1996 | Karlsson et al. | 455/450 |
| 5,956,619 | 12/1996 | Gallagher et al. | 455/12.1 |

FOREIGN PATENT DOCUMENTS

| | | | |
|---|---|---|---|
| 0748065 | 12/1996 | European Pat. Off. | H04B 7/185 |
| 9711536 | 3/1997 | WIPO | H04B 7/185 |
| 9722188 | 6/1997 | WIPO | H04B 7/08 |
| 9723065 | 6/1997 | WIPO | H04B 7/185 |

*Primary Examiner*—Nguyen Vo
*Assistant Examiner*—Duc Nguyen
*Attorney, Agent, or Firm*—James E. Klekotka; Harold C. McGurk

[57] ABSTRACT

A communication system is established for providing dual-coverage areas using communication satellites, one or more terrestrial stations and one or more dual-coverage subscriber units (DCSU). The communication system determines when and where to establish dual-coverage areas. Dual-coverage areas are provided using separate beams from two or more satellites. The satellites can be located in a variety of orbits around the earth. DCSUs receive signals and process data from at least two satellites at one time. DCSUs can also transmit signals to at least two satellites at one time. Data packets which are missing from one channel are replaced by data packets on another channel. Path delays are compensated for on the transmit side to minimize processing requirements on the receive side.

17 Claims, 3 Drawing Sheets

METHOD AND APPARATUS FOR REDUCING SIGNAL BLOCKING IN A SATELLITE COMMUNICATION SYSTEM

FIELD OF THE INVENTION

The present invention pertains to communication systems and, more particularly, to a method and apparatus for overcoming signal blocking problems in a communication system.

BACKGROUND OF THE INVENTION

Signal blocking and fading are constant concerns in communication systems, and especially in cellular communication systems. Signal blocking occurs when an obstruction (such as a building) impedes the reception of a communication signal. Fading occurs due to somewhat random attenuation changes within the transmission medium. Fading can also occur due to an obstruction (such as a building). In the field of cellular communications, signal blocking and fading can lead to poor quality communications, dropped calls, and customer dissatisfaction.

In conventional cellular systems, efforts are taken to locate cell sites, adjust power levels, adjust antenna structures, and allocate channels to cells so that signal blocking and fading are minimized. Once cell site locations, power levels, antenna structures, and channel allocations are established for conventional systems, they tend to remain relatively static so that any changes are difficult to make. Therefore, some blocking is inevitable.

When cellular base stations (e.g., satellites) are located in orbit around the earth, the blocking and fading problems become more complicated. In order to reduce cell size and reuse distance, base station satellites are desirably placed in low earth orbits, within which they travel at a high rate of speed. This may cause the cells to move over the surface of earth, making signal blocking and fading a problem that changes with time. Cell site location is not fixed but rather changes with time. In addition, antenna patterns change as a function of time and location. Consequently, blocking and fading problems are not as predictable in a satellite communication system as they are in conventional cellular systems.

Satellite communication systems need an improved means for mitigating signal fading and signal blocking. Because of the cost associated with launching and maintaining satellites in space, a satellite communication system must take full advantage of the resources on-board the satellites. Also, a method and apparatus are needed which accomplishes this by making modifications on the terrestrial side of the system. What is further needed is a means for bringing larger amounts of communication capacity to bear on densely populated areas while using only a limited amount of the radio frequency spectrum.

DETAILED DESCRIPTION OF A PREFERRED EMBODIMENT

The method and apparatus of the present invention improve the quality of communication services in areas where signal blocking and fading can occur. This is accomplished by adapting the dual-coverage subscriber unit (DCSU) and its operational methods to mitigate the effects of signal blocking and fading. The present invention provides an improved method and apparatus in which a dual-coverage subscriber unit detects signal blocking and fading conditions. The present invention advantageously implements a signal blocking and fading mitigation process without significantly impacting the resources located on the orbiting satellites. The method and apparatus of the present invention also can increase the capacity provided in densely populated areas while using only a limited amount of radio frequency spectrum.

In a preferred embodiment, in order to improve the quality of service into areas where obstructions can block out signals from a given direction, two satellites are used to provide diversity coverage from two different angles. In order to mitigate the effects of signal blocking and fading, the DCSU in the common area is assigned to a traffic channel on both satellites.

In a preferred embodiment, on the downlink side, the DCSU chooses from the voice packets received from either or both of the satellites. Because packets are simultaneously being received from two different satellites, the DCSU has reception diversity and hence protection from fading and blocking. In a preferred embodiment, on the uplink side, the DCSU transmits the same voice packets to both of the satellites. Because packets are simultaneously being transmitted to two different satellites, the DCSU also has transmission diversity and hence protection from fading and blocking. In addition, the DCSU can receive two or more channels and choose to transmit on one or more channel. When the DCSU switches to one channel, the DCSU informs the system about the change.

For example, if one of the satellites should disappear suddenly from view (such as occurs when a DCSU moves behind a building), the user of the DCSU can continue the conversation uninterrupted using the signal from the remaining satellite. When the second satellite comes back into view, the DCSU re-establishes a communication link (diversity channel) with the second satellite. If one of the two channels is lost, then the DCSU looks for another second satellite. The second satellite is necessary to provide a new diversity channel.

The DCSU maintains both channels until it decides to switch to single channel operation. Faded channels are re-established unless the faded channel has been gone too long. In a preferred embodiment, a channel is declared to be lost after ten seconds. When a channel is declared to be lost, the DCSU informs the system and begins looking for another satellite.

In a preferred embodiment, when a second satellite is located, the DCSU requests, through its present connection with the first satellite, that a new channel is to be established using the new satellite. In an alternate embodiment, when a second satellite is located, the DCSU independently establishes a new channel using the new satellite and informs the system.

In a preferred embodiment, the DCSU is used in a dual-service operating mode. This means the DCSU is processing data from two satellites which are positioned at different points in the sky. When the DCSU is being covered by a single satellite, the DCSU is used in a single-service operating mode. Single-service operation typically does not provide any diversity advantage. However, when high quality reception is important, then a redundant channel may be provided, thereby creating increased interference protection.

In some cases, hand-offs involve channels from different satellites. In these cases, the second channel may be established by the DCSU using the unused transceiver before the DCSU needs to hand-off to the other satellite. This allows for minimum voice disruption during hand-off, and avoids wasting resources by keeping two channels active for a minimum amount of time.

In a preferred embodiment of the present invention, compensation provides for the relatively large differential delay that could result because two different satellites are being used as sources. Differential path delay in the satellite systems is much greater than in terrestrial systems. In a preferred embodiment, the system compensates for the differential delay on the transmit side, so that the voice/data packets arrive at the DCSU at about the same time. This makes the DCSU's job of choosing the "best" packet easier. However, when the DCSU is transmitting multiple RF channels simultaneously, the DCSU compensates for the differential delay to the system so that the system receives the voice/data packets from both paths at about the same time.

Figure 1:
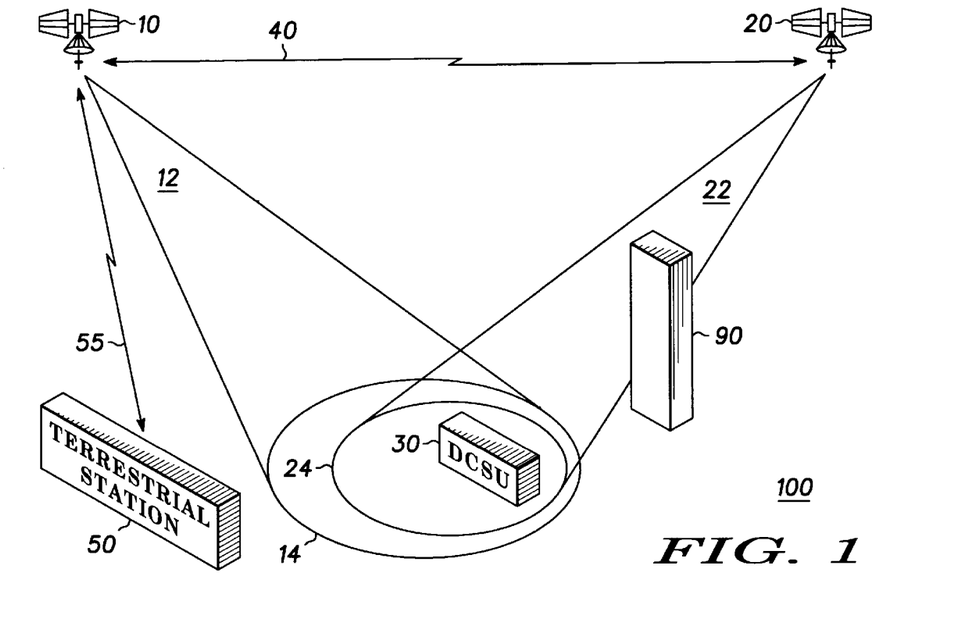
FIG. 1 shows a diagram of an environment within which the present invention may be practiced.

FIG. 1 shows a diagram of an environment within which the present invention may be practiced. Included in FIG. 1 is an illustration of a highly simplified diagram of communication system 100. Communication system 100 comprises at least two satellites 10 and 20, any number of DCSUs 30, and at least one terrestrial station 50. Generally, satellites 10, 20, DCSUs 30, and terrestrial station 50 in communication system 100 may be viewed as network nodes. All nodes of communication system 100 are or may be in data communication with other nodes of communication system 100 through communication links. Communication links may be interrupted by obstructions 90. Obstructions may also cause corrupted data to be received by a node.

Satellites 10,20 are located in outer space while terrestrial stations 50 and DCSUs 30 reside on or near the surface of the earth. Each satellite has its own coverage area (footprint) which extends over a fraction of the earth's surface. This footprint is approximately the region of the earth's surface that is within a line-of-sight view of satellites 10, 20 at any given instant.

Antennas (not shown) on satellites 10, 20 project beams 12 and 22 on a line-of-sight toward the earth that define cells 14 and 24 through which cellular communication services are offered to DCSUs 30. Cellular communication services are provided to DCSUs 30 from any point on the earth covered by a cell. Satellite footprints desirably encompass many cells and a blanket of cells desirably covers substantially the entire earth.

Those skilled in the art will recognize that satellites 10, 20 can be non-geostationary or geostationary satellites. In a preferred embodiment, satellites 10, 20 are low-earth orbit satellites which communicate with each other over cross-link 40. Only two satellites are shown to simplify the illustration. In this case, communication signals, command signals, and control signals are exchanged via cross-link 40. In a preferred embodiment, cross-link 40 is also used to coordinate the sending of data packets from satellite 10 and satellite 20 to DCSU 30. In an alternate embodiment, cross-link 40 is not necessary. In this case, the satellites are linked by terrestrial-based links.

Only one terrestrial station 50 is shown to simplify the illustration. In a preferred embodiment, at least one link 55 exists between communication satellite 10 and terrestrial station 50. In this case, communication signals, command signals, and control signals are exchanged via link 55, however other signals may be exchanged as well. In an alternate embodiment, additional terrestrial stations 50 and links 55 are necessary.

In a preferred embodiment, terrestrial station 50 communicates with and controls satellites 10, 20. There may be multiple terrestrial stations 50 located at different regions on the earth. Terrestrial stations 50, for example, provide satellite signaling commands to satellites 10, 20 so that satellites 10, 20 maintain their proper position in their orbit and perform other essential house-keeping tasks.

In a preferred embodiment, terrestrial stations 50 are additionally responsible for receiving voice and/or data from satellites 10, 20. Terrestrial stations 50 provide data communication services with communication devices dispersed throughout the world through public service telephone networks (PSTNs) and/or through conventional terrestrial communication systems.

Communication system 100 also has a number of DCSUs 30. DCSUs 30 are preferably communication devices capable of receiving voice and/or data from two different satellites 10, 20 simultaneously. By way of example, DCSUs 30 may be hand-held, mobile satellite cellular telephones adapted to transmit to and receive transmissions from two different satellites 10, 20. Also, by way of example, DCSUs 30 may be paging devices adapted to transmit to and receive transmissions from two different satellites 10, 20.

The present invention is applicable to any communication system that assigns particular regions on the earth to specific cells on the earth, and preferably to systems that move cells across the surface of the earth. The present invention is applicable to space-based communication systems having at least one satellite in low-earth orbit and at least one other satellite in a low-earth, medium-earth or geosynchronous orbit.

Satellite 10 may be a single satellite or one of many satellites in a constellation of satellites orbiting earth. Satellite 20 may also be a single satellite or one of many satellites in a constellation of satellites orbiting earth. The present invention is also applicable to space-based communication systems having satellites which orbit earth at any angle of inclination including polar, equatorial, inclined or other orbital patterns. The present invention is applicable to systems where full coverage of the earth is not achieved (i.e., where there are "holes" in the communication coverage provided by the constellation). The present invention is applicable to systems where dual-coverage occurs for certain portions of the earth's surface.

Beams 12, 22 and links 40, 55 encompass a limited portion of the electromagnetic spectrum that is divided into numerous channels. Beams 12, 22 are preferably combinations of L-Band frequency channels and encompass a Frequency Division Multiplex Access (FDMA) and Time Division Multiple Access (TDMA) communications combination.

Further, FIG. 1 illustrates the applicability of the method and apparatus of the present invention in enabling soft hand-offs between overlapping cells (beams) from different satellites. FIG. 1 illustrates one satellite's cell 14 with an overlapping cell 24 from a different satellite's beam in accordance with a preferred embodiment of the present invention. Cell 14 is projected by beam 12 from satellite 10, and FIG. 1 illustrates one cell in a multi-cell format. Cell 24 is projected by beam 22 from satellite 20, and FIG. 1 illustrates one cell in a multi-cell format. DCSU 30 is located in the over-lapping area covered by both satellite cellular beam 12 and satellite cellular beam 22.

The method and apparatus of the present invention enable communication system 100 to inform DCSU 30 of all overlapping footprints which DCSU 30 is allowed to use. Satellites 10, 20 include an array of antennas, and each antenna array projects numerous discrete antenna patterns or beams toward the earth's surface. Beam 12 and beam 22 illustrate a single beam from each satellite, and other beams from satellites 10, 20 are not shown in FIG. 1 to simplify the illustration.

The pattern of beams that a single satellite projects on the earth's surface is referred to as a footprint. The precise number of beams included in a footprint is unimportant for the purposes of the present invention. The footprint formed on the earth by an individual antenna beam is often referred to as a "cell". Thus, the antenna pattern footprint is described as being made up of multiple cells.

For convenience, FIG. 1 illustrates cell 14 and cell 24 as being discrete, generally elliptical shapes. However, those skilled in the art will understand that the cells created by the beams projected from the antennas of satellites may actually have a shape far different than an elliptical shape, that some cells may cover larger areas than other cells, and that some overlap between adjacent cells may be expected although not illustrated in FIG. 1.

Figure 2:
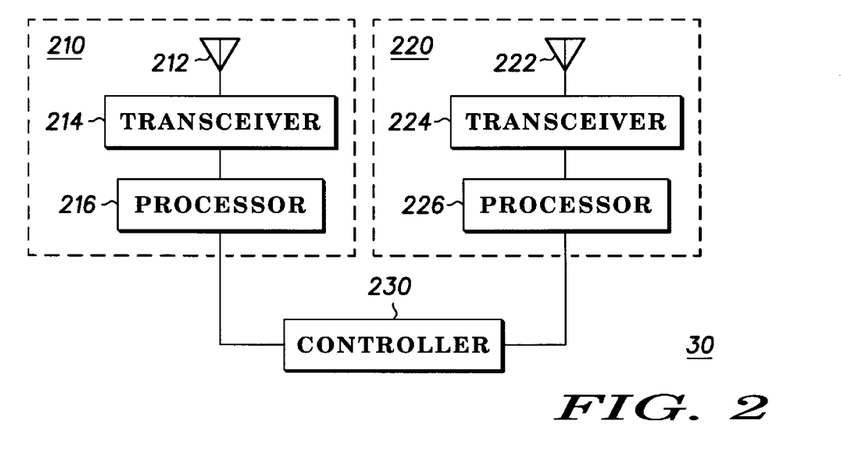
FIG. 2 shows a simplified block diagram of a dual-coverage subscriber unit in accordance with a preferred embodiment of the present invention.

FIG. 2 shows a simplified block diagram of a dual-coverage subscriber unit in accordance with a preferred embodiment of the present invention. DCSU 30 receives and processes signals from two different sources which are preferably satellites. In a preferred embodiment, DCSU 30 comprises common controller 230 and two separate RF subsystems 210, 220 which have separate antennas 212 and 222, separate RF transceivers 214 and 224, and separate processors 216 and 226. Common controller 230 is coupled to both processor 216 and processor 226.

Antenna 212 is coupled to transceiver 214 and transceiver 214 is coupled to processor 216. Antenna 222 is coupled to transceiver 224 and transceiver 224 is coupled to processor 226. Antennas 212 and 222 are for transmitting and receiving data messages to and from the two different satellites. Of course, those skilled in the art will appreciate that antennas 212 and 222 may be implemented either as single multi-directional antennas, as a number of discrete antennas or array antennas.

Transceivers 214 and 224 are for processing the transmission signals which are used to convey the data messages to and from the two different satellites. Although only two transceivers 214 and 224 are shown in FIG. 2, multiple transceivers may be necessary since the subscriber unit supports more than two channels. Those skilled in the art will recognize that multi-channel transceivers can be used. Data messages transmitted and received by DCSU 30 are described in more detail below.

Processor 216, processor 226 and controller 230 may be implemented using one or more processors. In a preferred embodiment, processor 216 and processor 226 control the frequency and timing parameters upon which transceiver 214 and transceiver 224 operate. In addition, processor 216 and processor 226 preferably control the power level at which transceiver 214 and transceiver 224 transmit signals.

In an alternate embodiment, satellite 10 and satellite 20 could be in different orbits which require different transmit power levels.

In a preferred embodiment, processor 216, processor 226 and controller 230 contain memory elements (not shown). Memory elements store data that serve as instructions to processor 216, processor 226 and controller 230 and that, when executed by processor 216, processor 226 and/or controller 230, cause DCSU 30 to carry out procedures which are discussed below. In addition, memory elements may store variables, tables, and databases that are manipulated during the operation of DCSU 30. In a preferred embodiment, memory elements contain data buffers for storing blocks of data from individual timeslots.

Controller 230 is coupled to processor 216 and processor 226. In a preferred embodiment, controller 230 is for evaluating received data and for modifying data in accordance with the present invention. Controller 230 maintains, among other things, system timing that determines which timeslots are used by the two different RF subsystems. In addition, controller 230 generally controls and manages user access. The functionality of controller 230 is described in more detail in conjunction with FIGS. 3 and 4.

In a preferred embodiment, DCSU transceivers 214, 224 are multi-channel FDMA/TDMA transceivers capable of transmitting and receiving on all different selectable frequencies during particular, selectable, time slots as directed by processors 216, 226 and controller 230. DCSU transceivers 214, 224 contain multi-channel radios having sufficient number of channels to provide the desired number of transmission and reception frequencies for operating with two different satellites. DCSU transceivers 214, 224 desirably provide for transmission and reception on one or more frequency channels.

Transceivers 214, 224 desirably comprise an acquisition channel transceiver portion, a broadcast channel receiver portion, and a traffic channel transceiver portion. The acquisition channel transceiver portion communicates on one of several acquisition channels as determined by satellites 10, 20 and is primarily used during access protocols when a subscriber desires access to communication system 100 as previously discussed. The traffic channel transceiver portion communicates with communication system 100 on a traffic channel assigned by satellite 10 or by satellite 20. Those of ordinary skill in the art will understand that the acquisition channel transceiver portion, the broadcast channel receiver portion and the traffic channel transceiver portion may be contained in one unit capable of all three functions.

In a preferred embodiment, satellite 10 and/or satellite 20 continuously transmits over one or more broadcast channels. DCSUs 30 synchronize to broadcast channels and monitor broadcast channels to detect data messages which may be addressed to them. DCSUs 30 may transmit messages to satellites 10,20 over one or more acquisition channels. Broadcast channels and acquisition channels are not dedicated to any one DCSU 30 but are shared by all DCSUs. Traffic channels are two-way channels that are assigned to particular DCSUs 30 by satellites 10, 20 from time to time.

A combination FDMA/TDMA format used in a preferred embodiment of the present invention to support communications between the two satellite nodes 10, 20 and a DCSU node 30. The entire electromagnetic spectrum allocated to system 100 for these communication channels is divided into a number of frequency channels. In addition, the time over which data transfer occurs between satellites 10, 20 and DCSU 30 is divided into sequentially occurring frames. A frame is divided into transmit time slots and receive time slots. The precise timing of the timeslots is defined relative to the timing of a frame. Of course, those skilled in the art will appreciate that any number of time slots may be included in a frame, that the number of transmit time slots need not precisely equal the number of receive time slots, and that the duration of transmit time slots need not equal the duration of receive time slots. A frame may additionally include time slots which are allocated to other purposes, such as preamble or frame management, signaling, and the like. In a preferred embodiment, a time-frame is desirably between 25 and 120 milliseconds and preferably around 90 milliseconds.

A particular frequency channel is used during a single particular pair of transmit and receive time slots. While it may be desirable for transmit and receive time slots to reside at a common frequency channel, this is not a requirement. The frequency and time assignments may change from frame to frame. In a preferred embodiment, the framing and management of the electromagnetic spectrum is desirably controlled by one or more terrestrial stations 50. Satellites 10, 20 and DCSUs 30 adapt their operations to meet requirements established by the system.

In a preferred embodiment, there is an over-lapping coverage area, and the DCSU is located in the over-lapping coverage area. In addition, the DCSU receives and processes signals from at least two RF channels. When the DCSU is in an area where only one satellite is providing coverage, then the DCSU only uses one RF channel unless the DCSU is operating in a redundant mode or is performing a beam to beam hand-off using the single satellite.

In a preferred embodiment, soft hand-off conditions are inherent in the system. Over-lapping coverage areas are provided in which coverage is provided by two different satellites located at different locations. The DCSU located in the over-lapping coverage area receives and processes the signals from the two different satellites. The DCSU does a soft hand-off by switching from one channel to another without losing contact with the communication system.

In a preferred embodiment, channel diversity is also provided because the two different signals come from two different satellites. The DCSU receives and processes the two different signals and is able to switch between the two different signals. When the two different signals are received from the same satellite, they are subject to the same fading effects and the same blockages, thus, spatial diversity is not provided.

In a preferred embodiment, one channel is used, when signal coverage is available from only one satellite, except for the short period of time when the DCSU needs to hand-off from one beam to another under the same SV. In an alternate embodiment, a redundant mode is provided in which two channels from the same satellite are used in order to mitigate interference received on one of the two channels. Maintaining single channel operation except during handoffs minimizes the use of channel resources in the system and the DCSU. This provides power savings in both the DCSUs and the satellites and greater subscriber service capacities.

Figure 3:
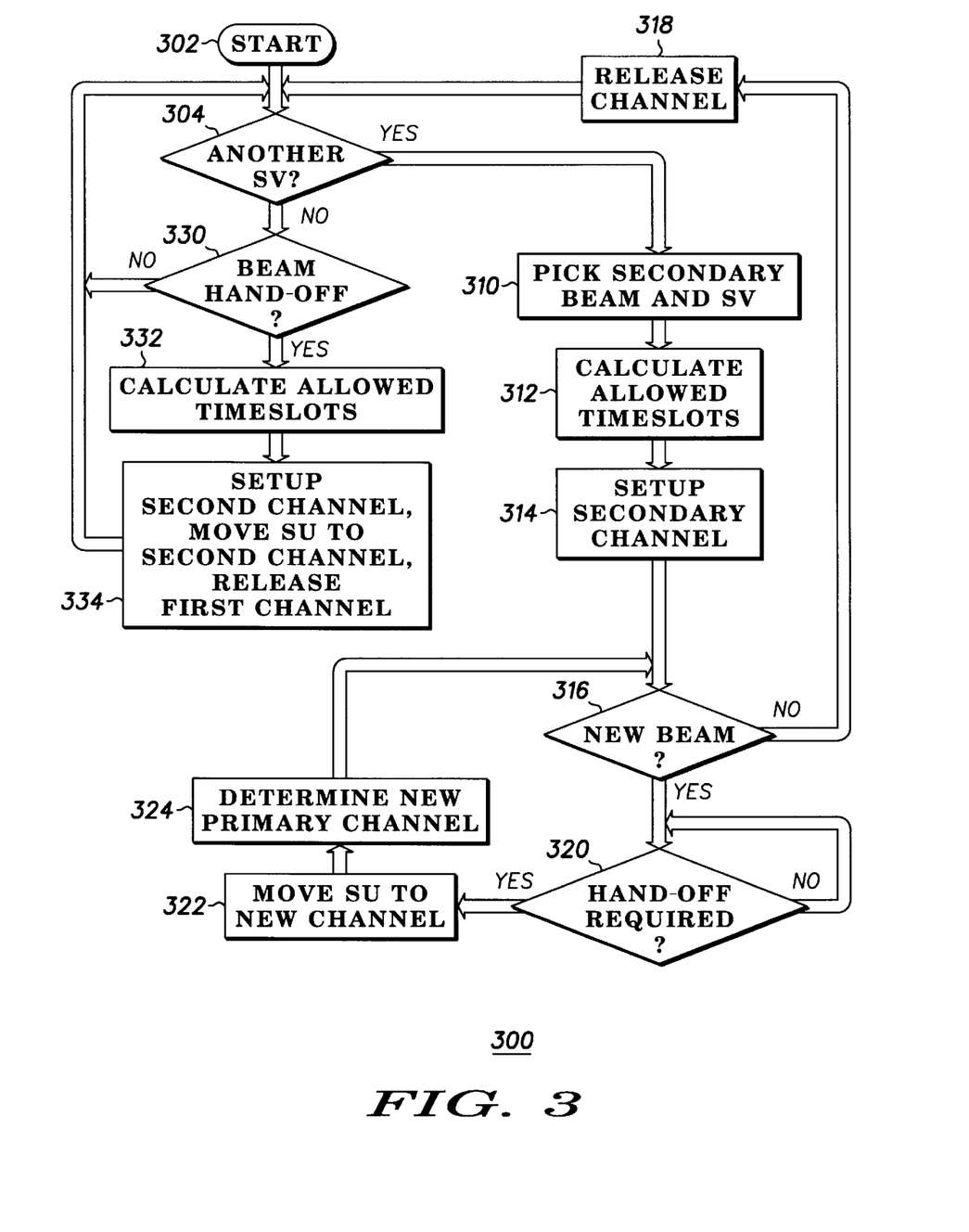
FIG. 3 shows a flowchart of a method for using a dual-coverage subscriber unit in accordance with a preferred embodiment of the present invention.

FIG. 3 shows a flowchart of a method for using a dual-coverage subscriber unit in accordance with a preferred embodiment of the present invention. Procedure 300 starts with step 302.

Step 302, for example, could be the result of a call being made by a user using a dual-coverage subscriber unit in a communication system which has been adapted to provide dual-coverage areas within the communication system. When the user starts a call, the dual-coverage subscriber unit being used is assigned to a particular RF channel. Typically, this RF channel is on the strongest beam which can be on the strongest satellite. After the DCSU is on an RF channel, the DCSU, which has been adapted to operate in this environment, begins to evaluate the presence of other satellites.

In step 304, the dual-coverage subscriber unit determines if there is a beam from another satellite covering this location at this particular time. When this location does have dual beam coverage, then procedure 300 branches to step 310. When this location does not have dual beam coverage, then procedure 300 branches to step 330.

In step 310, the dual-coverage subscriber unit evaluates the beams from the two or more different satellites. Since there is at least one other satellite providing coverage at this location, the DCSU needs to establish a secondary RF channel. The secondary channel is established with the other (secondary) satellite. In a preferred embodiment, the primary and secondary channel determinations are based on a combination of signal strength and bit error rates for the channels. The secondary channel provides protection against signal fading and blocking that could occur with a single channel originating from a single point in the sky.

In step 312, the DCSU determines which frequencies and/or timeslots to allocate to the primary channel and which frequencies and/or timeslots to allocate to the secondary channel. In a preferred embodiment of the present invention, the system is based upon a TDMA type framing structure. When the secondary RF channel is selected from the second satellite, the signal from the second satellite cannot be allowed to interfere with the signal from the first satellite. Therefore, a calculation needs to be done to determine which of the available frequencies are useable for a secondary RF channel. In an alternate embodiment, the DCSU has at least two receivers and can receive both signals regardless of which timeslot is used for either channel.

In a preferred embodiment, the dual-coverage subscriber unit determines which frequencies are being used. In an alternate embodiment, the system determines which frequencies are being used. Also, in a preferred embodiment, the dual-coverage subscriber unit determines which timeslots are being used. In an alternate embodiment, the system determines which timeslots are being used.

In a preferred embodiment, the dual-coverage subscriber unit knows which timeslots the primary RF channel is processing. In addition, the DCSU knows the expected signal delay for the primary path and the expected signal delay for the secondary path. The DCSU uses this information to determine which timeslots are to be processed by the secondary channel.

In step 314, a secondary RF channel is established. In a preferred embodiment, a dual-coverage subscriber unit uses separate processing paths for the primary and secondary channels, and it can multiplex between the two paths. The DCSU does this to simultaneously receive and process signals from two different sources. In a preferred embodiment, the DCSU comprises a common controller and two separate RF subsystems which have separate antennas, separate RF transceivers, and separate processors. The common controller determines how to multiplex between the two sources and which frequencies and/or timeslots are used by the two different RF subsystems.

Each RF subsystem buffers the data from a certain number of timeslots. The number of timeslots is determined by the system design. The two separate RF subsystems process and store data in parallel. The data is processed into blocks based on the timeslot information and the delay information. The data is stored by the DCSU in buffers. For example, data records can be examined with respect to signal quality, number of errors, and duplicity.

In step 316, the DCSU determines when a new beam is available. After the secondary RF channel is established, the DCSU begins looking for candidate beams which will be used for future hand-offs. A dual-coverage subscriber unit evaluates candidate beams to replace both the primary channel and the secondary channel. The DCSU monitors both satellites to determine when hand-off conditions are occurring. Hand-off conditions occur because of relative movement between the satellites and the DCSU. When the DCSU is monitoring signals from two different satellites, then hand-off conditions can occur with either satellite. Typically, hand-off conditions occur with one satellite at a time, but the present invention does not prevent the DCSU from handing-off two satellites at substantially the same time.

In the case where the new beam is a candidate for the primary channel, the new primary channel beam can be from the old primary satellite or a new primary satellite. If the new primary channel beam is from the old primary satellite, then the DCSU monitors the traffic channel from the primary satellite to obtain hand-off information. In an alternate embodiment, the new primary channel beam is from a new primary satellite which may be in another orbit, then the DCSU can monitor a broadcast channel from the new primary satellite to obtain hand-off information.

In a preferred embodiment, hand-off data is sent over the traffic channel. Likewise, requests for new secondary channels are sent via control messages sent over the traffic channel. Broadcast channels are only needed to either initially gain access to the system or used for beam to beam hand-off signal strength comparisons.

Any time a hand-off off is done, a "soft" hand-off is preferred. This is accomplished when the subscriber unit transitions from one beam to another beam on the same satellite. This is also accomplished when the DCSU is in an area with at least two satellites providing coverage. This is also accomplished by the DCSU when the second channel is used to acquire a new channel on a new satellite. This allows a soft hand-off to occur because the second channel is processing data before the first channel is lost.

In the case where the new beam is a candidate for the secondary channel beam, the new secondary channel beam can be from the old second satellite or a new second satellite. In a preferred embodiment, when the new secondary channel beam is from the old second satellite, then the DCSU monitors the traffic channel from the old second satellite to obtain hand-off information. Hand-off information can be sent on either the primary channel or the secondary channel. In an alternate embodiment, when the new secondary channel beam is from a new second satellite, then the DCSU monitors a broadcast channel from the new second satellite to obtain hand-off information.

When a new beam is available, then procedure 300 branches to step 320 where hand-off conditions are examined. When a new beam is not available, then procedure 300 branches to step 318.

In step 318, the DCSU releases one of the communication channels it was using. In some instances, this is the primary channel. In other instances, it is the secondary channel. In one case, the released traffic channel is with the first satellite and in other case the traffic channel being released is with the second satellite. In any event, the DCSU has to begin looking for another satellite by monitoring the frequency or frequencies designated as broadcast channels for the system. After completing step 318, procedure 300 branches to step 304, and procedure 300 iterates as shown in FIG. 3.

In step 320, the DCSU determines if a hand-off is required. Hand-off priorities can vary. If a hand-off is required for a primary channel, then this requirement can be given a higher priority. If the hand-off is required for a secondary channel, then this hand-off requirement can be given a lower priority.

Priorities can also be established based on the current location for the DCSU. System loading can vary at different locations. Priorities can also be established based on the current time. System loading can vary with time.

Priorities can also be affected by the type of hand-off. For example, an intra-satellite hand-off typically takes less time than an inter-satellite hand-off. When a hand-off is required, procedure 300 branches to step 322. When a hand-off is not required, then procedure 300 re-iterates step 320.

In step 322, the DCSU completes the hand-off to the new channel. Again, this can be a new channel from the old first satellite, the old second satellite, a new first satellite, or a new second satellite.

In step 324, the DCSU evaluates the signals from the two different satellites to determine which channel is a primary channel and which channel is a secondary channel. In a preferred embodiment of the present invention, the DCSU establishes one channel as a primary channel and the other channel as the secondary channel. Typically, the primary channel is used for obtaining most of the data and the secondary channel is used to overcome problem with signal blockage and fading. For example, the DCSU can establish a primary channel based on signal strength.

In alternate embodiments of the present invention, the secondary channel can be used for security reasons. For example, the DCSU could use both channels to receive and process data blocks. The DCSU could then confirm a data block using information received and processed on the second channel. Other systems could use the two channels to provide a higher level of assurance that the message data will be received and processed correctly by the DCSU. For example, this could be accomplished by comparing data blocks received and processed by both channels and making comparisons between the data obtained using the first channel with data obtained using the second channel.

After step 324, procedure 300 branches to step 316 and iterates as shown in FIG. 3 and as described above.

In step 330, the dual-coverage subscriber unit functions like a single-coverage unit and determines when a hand-off is anticipated. In a preferred embodiment, the DCSU uses information which it has stored along with information received from the system to make this determination.

The system has access to data which describes the location of the satellites in the communication system with respect to time (or topology of the satellite system). The DCSU is capable of calculating its location in relation to the beam footprint of one or more serving satellites using the location data and satellite location data. The DCSU can store some satellite topological data. The system predicts the relative location of the satellites with respect to one another and with respect to the DCSU at given points in time. The DCSU predicts its location within the satellite beam (cell) geometry to predict any imminent fading. The DCSU calculates how long it needs to hand-off the currently used channel. Additionally, the DCSU calculates approximately how long it will remain in the current beam. In order to make a choice, the DCSU begins looking for hand-off candidates in time to allow for a hand-off to occur without adversely affecting the transmission and reception of data.

The topology of the network is used to establish which beams to use as hand-off candidates. A satellite's status can vary at different times and at different locations. Some locations are not always covered by beams from two different satellites.

When a hand-off to a new channel is not required, then procedure 300 branches to step 304, and procedure 300 iterates as shown in FIG. 3. When a hand-off to a new channel is required, then procedure 300 branches to step 332.

In step 332, the DCSU determines which timeslots are affected by the required hand-off. The DCSU determines which time slots to allocate to the first channel and which timeslots to allocate to the second channel. In a preferred embodiment of the present invention, the system is based upon a TDMA type framing structure. When the second RF channel is selected, the data blocks from the second channel can be allowed to overlap with the data blocks from the first channel. In this case, this can be done because the DCSU has the ability to simultaneously track two channels. The common controller determines which data blocks to present to the user as message information. The common controller discards duplicate data blocks. The common controller receives data blocks from both channels.

In a preferred embodiment of the present invention, the DCSU does not establish a second channel when coverage is available only via a single satellite (redundant mode operation is optional for single channel interference mitigation purposes). The DCSU only establishes two traffic channels during the time beginning just before and ending just after a hand-off.

When a DCSU is using two traffic channels to communicate with the system, then the DCSU has to determine which channel to use to get the data. The DCSU has to determine which timeslots contain duplicate data and whether or not the timeslots in the different channels are aligned or if one of the channels is leading or lagging the other with respect to time.

The DCSU must also have a buffer for storing data blocks. Each data block is defined as the amount of data that fits into one timeslot. If the differential delay between the two channels is large, then the DCSU must have a deep buffer which is capable of storing many data blocks. The DCSU must also be able to determine how far to look ahead or behind to make a good judgment about the amount of overlap. The DCSU needs to determine how many data blocks to store for the first channel and how many data blocks to store for the second channel. Those skilled in the art will recognize that the number for the first channel does not have to be the same as the number for the second channel.

In step 334, the second RF channel is established. The DCSU releases the first channel. After the second RF channel is established, the DCSU must continue to look for new satellites and candidate beams which will be used in the future. After step 334, procedure 300 branches to step 304 and iterates as illustrated in FIG. 3.

Figure 4:
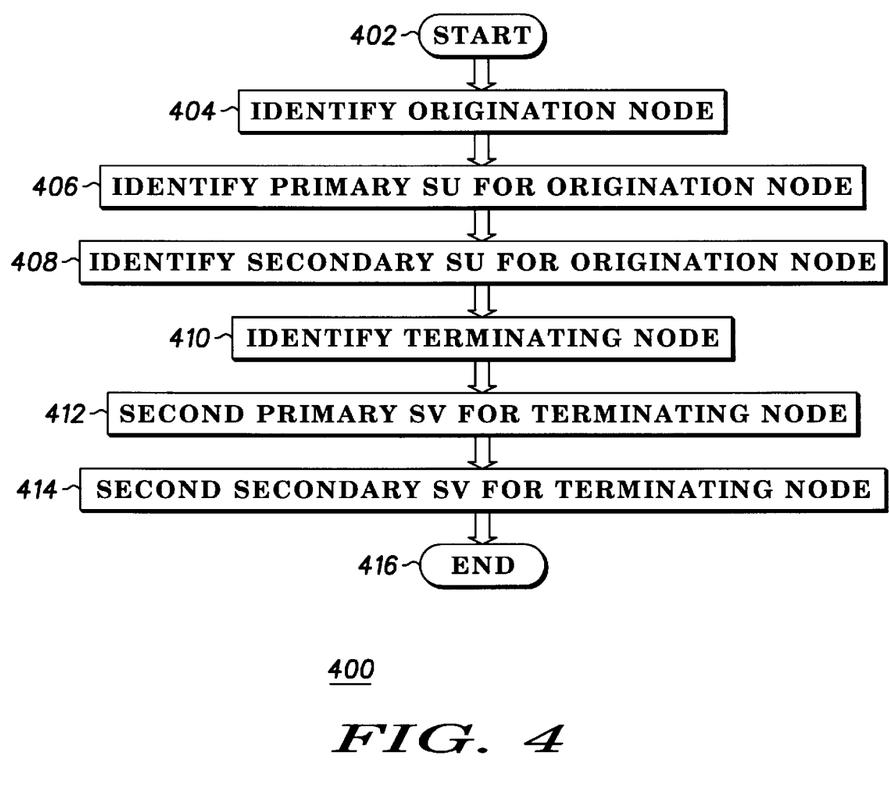
FIG. 4 shows a flowchart of a method for operating a communication system to provide improved communication services to a subscriber unit in accordance with a preferred embodiment of the present invention.

FIG. 4 shows a flowchart of a method for operating a communication system to provide improved communication services to a subscriber unit in accordance with a preferred embodiment of the present invention. Procedure 400 starts with step 402. For example, step 402 could be the result of a time or location checkpoint. That is, dual coverage regions could be necessary only at certain times of the day and/or necessary in local areas serviced by the communication system. In a preferred embodiment, at least one system control center performs the steps illustrated for procedure 400. In a preferred embodiment, step 402 is caused by a system user requesting a dual coverage service.

In step 404, the system establishes the user's position and determines a first dual-service coverage area. A system control center has access to data which describes the location of the satellites in the communication system with respect to time. The system control center also has information concerning the location and size of the dual coverage area. The system control center is capable of calculating the location of the dual coverage area in relation to the beam footprints of one or more serving satellites. A system control center stores satellite location data and predicts the relative location of the satellites with respect to one another and with respect to the earth at given points in time.

In step 406, a primary satellite is identified which can provide a beam that will include at least some of the dual coverage area. Because the satellites are moving rapidly with respect to the earth the beams from the satellites are also moving rapidly with respect to the dual coverage area. A number of primary satellites are identified that will provide some coverage for a given amount of time.

In step 408, a secondary satellite is identified which can provide a beam that will include at least some of the dual coverage area. Because the satellites are moving rapidly with respect to the earth the beams from the satellites are also moving rapidly with respect to the dual coverage area. A number of secondary satellites are identified that will provide some coverage for a given amount of time.

In a preferred embodiment, routing is accomplished by attaching routing information to the individual packets. The routing scheme used within the constellation affects the delay through the constellation. Some data packets are delayed more than others as they are routed through the constellation to their destination.

In step 410, a terminating node is identified from information provided by the originating node. In a preferred embodiment, the terminating node is also a dual service device. In alternate embodiments, single channel devices could be combined to form a dual service device. In a preferred embodiment, a second dual-service coverage area is established based on the terminating node's location.

For bi-directional communications, the source node typically needs to have routing information for a single path to the destination node, and the destination node typically needs to have routing information for a single path to the source node. In addition, the source node typically does not need to know how much routing delay there is between it and the destination node. Also, the destination node typically does not need to know how much routing delay there is between it and the source node.

For dual-service bi-directional communications, the source node requires routing information for two paths to the destination node, and the destination node also requires routing information for two paths to the source node. In addition, the source node needs to know how much routing delay there is between it and the destination node for both paths. Also, the destination node needs to know how much routing delay there is between it and the source node for both of these paths. By knowing the delays for the two paths the node can determine a value for the delay difference. The delay difference is used to offset the transmit time for the data packets on the two paths. In a preferred embodiment, the sending node compensates for the delay difference and staggers its transmission accordingly. The compensation is done so that the two data packets arrive at the receiving node at approximately the same time.

In a preferred embodiment, compensation is performed at the transmitting end based on information from the system. In an alternate embodiment, compensation is performed at one of the two ends by observing the delay difference in the arriving packets and adjusting the transmission delay back to the source. In another alternate embodiment, both ends can perform compensation. In this case, the delay information is shared by both ends since they will no longer be able to directly deduce the differential delay since the other end has introduced some delay compensation.

In step 412, a second primary satellite is identified which can provide a beam that will include at least some of the second dual-service coverage area. Those skilled in the art will understand that a second set of primary satellites may be identified. Because the satellites are moving rapidly with respect to the earth the beams from the satellites are also moving rapidly with respect to the second dual-service coverage area.

More than one satellite may be identified if a single satellite does not provide the necessary coverage for the required amount of time. This amount of time is dependent on the relative movement and direction of movement between the node and the satellite. The amount of time is also dependent on the node's position relative to the satellite's coverage area. Proximity to an edge of a coverage area can be a factor. Historical data which relates to call duration can also affect the estimate for the amount of time.

In a preferred embodiment, two primary signal paths and two secondary signal paths are possible between two dual-service nodes. Each node is serviced by a primary satellite and a secondary satellite. A first primary signal path can be established using the sending node's primary satellite and the receiving node's primary satellite. A second primary signal path can be established using the sending node's primary satellite and the receiving node's secondary satellite. A first secondary signal path can be established using the sending node's secondary satellite and the receiving node's primary satellite. A second secondary signal path can be established using the sending node's secondary satellite and the receiving node's secondary satellite. The system determines which is the best primary signal path and which is the best secondary signal path. The system sends the best path information to the nodes.

In step 414, a second secondary satellite is identified which can provide a beam that will include at least some of the second dual-service coverage area. Those skilled in the art will understand that a second set of primary satellites may be identified. Because the satellites are moving rapidly with respect to the Earth the beams from the satellites are also moving rapidly with respect to the second dual-service coverage area. Procedure 400 ends in step 416.

A packet represents the amount of data which can be transported in one timeslot. Preferably, a packet includes a header portion and a user data portion. The header represents routing and overhead data which serves to get a packet to its destination node. The header is effectively used to route the packets through the network of nodes. At the packet's destination, payload data are processed. In other words, the purpose of sending packet to a destination is typically to deliver the information associated with the payload data and not only the information associated with header.

Routing information contains a destination code which identifies the destination node that is to receive the packet. Routing information is utilized by the routing method at intermediate nodes to route the packet through the constellation of nodes. Destination codes are used to differentiate between various calls within the system. Destination codes are used to map a packet to an assigned traffic channel of the link between the satellite and the DCSU. Destination codes may also be included in other portions of packet. Destination codes may include a destination satellite number or other designator for the destination of the packet. Destination codes are desirably assigned within the system and known by all nodes participating in the process of packet transfer. When a satellite at either end of a call changes because of a satellite-to-satellite hand-off, the packets are given a new destination code which corresponds to the new end satellite that is servicing the call.

A null packet is used to synchronize the transmission link prior to sending data or to maintain synchronization where no packets are available for transmission. The end-of-burst packet is used to signify the end of the burst transmission from the transmitting node. Typically, null packets and end-of-burst packets are discarded. When a packet's payload is destined for an individual DCSU, it is transported using a traffic channel.

Because constellation topologies change with time, data packets from a source node may be routed to a destination node over divergent paths. In this case, a destination node may receive packetized information out-of-sequence. Data sequence processing is performed using sequence numbers which are attached to the data packets before transmission. In a preferred embodiment, a sequence number is included in the packet header.

Traditionally, out-of-sequence packets were serviced by accepting only those packets received in order and requesting a re-transmission of those packets received out-of-sequence. Additionally, re-transmission requests may have occurred prematurely as sequential packets may have propagated through paths having different delays. Often times, a request for re-transmission may cause a link to reset and perform overhead functions. Furthermore, some packets may be lost or destroyed in the network and never arrive at the destination.

DCSU receive uncorrupted and corrupted signals. When corrupted signals are processed, corrupted or missing blocks of data may result. Packets are received and stored in the sequence in which they were received. Using this transient storing scheme, packets are not immediately recognized as being lost or out-of-sequence. It is not until the controller processes these data packets that proper sequencing is determined and missing packets are identified.

When the controller processes the sequence of packets, the controller determines the existence of a lost or out-of-sequence packet. The controller maintains a record denoting an expected sequence of packets. When an out-of-sequence packet is processed, it is temporarily stored in a packet buffer according to its sequence identifier. Each of packets transmitted contains a sequence identifier denoting an order or sequence essential to re-organizing the packets back into an information string.

The controller uses the packet buffer to re-organize the packets back into an information string. Packets which cannot be re-organized within a given length of time are discarded. The controller continues to receive new packets and uses new and old packets to perform the re-organization process.

Controller 230 monitors for an arrival of a new packet from either processor 216 or processor 226. In a preferred embodiment, processor 216 and processor 226 also include one or more packet buffers. The packet buffers temporarily store at least one received packet from transceivers 214, 224. A packet buffer may be implemented in a software or a hardware memory structure.

The present invention has been described above with reference to a preferred embodiment. However, those skilled in the art will recognize that changes and modifications can be made in this embodiment without departing from the scope of the present invention. For example, while a preferred embodiment has been described in terms of a particular flow diagram, other methods can also be employed. In addition, the present invention need not be restricted to use only in connection with satellite communication systems. Those skilled in the art may easily adapt the teaching of the present invention to any other system which could provide dual-coverage areas and devices. Accordingly, these and other changes and modifications which are obvious to those skilled in the art are intended to be included within the scope of the present invention.

What is claimed is:

1. In a communication system, a method for reducing data interruptions due to signal blocking and signal fading, said method comprising the steps of:

(a) obtaining a first block of data at a first communication satellite, said first communication satellite being at a first location;

(b) obtaining a second block of data at a second communication satellite, said second communication satellite being at a second location and being coupled to said first communication satellite via a space-based cross-link;

(c) identifying a dual-coverage subscriber unit, said dual-coverage subscriber unit being at a third location, said dual-coverage subscriber unit comprising two separate radio frequency (RF) subsystems having separate antennas;

(d) establishing a primary communication channel from said first communication satellite to said dual-coverage subscriber unit;

(e) establishing a secondary communication channel from said second communication satellite to said dual-coverage subscriber unit, said dual-coverage subscriber unit using said two separate RF subsystems to simultaneously receive and process signals from said primary communication channel and said secondary communication channel, said primary and secondary channel determinations being based on a combination of signal strength and bit error rates for the channels;

(f) sending said first block of data from said first communication satellite to said dual-coverage subscriber unit using said primary communication channel;

(g) sending said second block of data from said second communication satellite to said dual-coverage subscriber unit using said secondary communication channel, wherein said space-based cross-link is used to coordinate the sending of said first block of data from said first communication satellite and the sending of said second block of data from said second communication satellite;

(h) receiving a third block of data at said dual-coverage subscriber unit, wherein said third block of data is a corrupted version of said first block of data;

(i) receiving a fourth block of data at said dual-overage subscriber unit, wherein said fourth block of data is a corrupted version of said second block of data; and (j) processing said third block of data and said fourth block of data at said dual-coverage subscriber unit, said dual-coverage subscriber unit determining which frequencies and timeslots to use for said two separate RF subsystems.

2. The method as claimed in claim 1, wherein said first location is in a first non-geosynchronous orbit about an Earth and said second location is in a second non-geosynchronous orbit about the Earth.

3. The method as claimed in claim 1, wherein said first location is in a non-geosynchronous orbit about earth and said second location is in a geosynchronous orbit about the earth.

4. The method as claimed in claim 1, wherein said first location is in a geosynchronous orbit about an earth and said second location is in a non-geosynchronous orbit about the earth.

5. The method as claimed in claim 1, wherein said first location is in a first geosynchronous orbit about an earth and said second location is in a second geosynchronous orbit about the earth.

6. The method as claimed in claim 1, wherein step (c) further comprises the steps of:

(c1) reading, by said first communication satellite, header information from said first block of data; and (c2) identifying, by said first communication satellite, said dual-coverage subscriber unit using said header information.

7. The method as claimed in claim 6, wherein step (c) further comprises the steps of:

(c3) reading, by said second communication satellite, header information from said second block of data; and (c4) identifying, by said second communication satellite, said dual-coverage subscriber unit using said header information.

8. The method as claimed in claim 1, wherein step (j) further comprises the steps of:

(j1) determining a first number of data packets in said third block of data;

(j2) establishing a sequence number for each of said first number of data packets;

(j3) determining when a data packet is missing from said first number of data packets, wherein a missing data packet is identified using a particular sequence number; and (j4) replacing said missing data packet with a redundant data packet obtained from said fourth block of data, said redundant data packet having said particular sequence number.

9. A method for operating a system control center to provide improved communication services to a dual-coverage subscriber unit (DCSU) in a communication system, said communication system comprising a plurality of communication satellites and a plurality of DCSUs, said plurality of communication satellites being cross-linked to each other and communicating with said system control center, said method comprising the steps of:

receiving a request for dual coverage service from an origination DCSU;

determining from said request a first dual-service coverage area, said first dual-service coverage area being determined using a location for said origination DCSU;

identifying a first primary satellite, said first primary satellite providing a beam for a first part of said first dual-service coverage area;

identifying a first secondary satellite, said first secondary satellite providing a beam for a second part of said first dual-service coverage area;

determining from said request a second dual-service coverage area, said second dual-service coverage area being determined using a location for a termination DCSU;

identifying a second primary satellite, said second primary satellite providing a beam for a first part of said second dual-service coverage area;

identifying a second secondary satellite, said second secondary satellite providing a beam for a second part of said second dual-service coverage area;

determining a primary signal path between said origination DCSU and said termination DCSU;

determining a secondary signal path between said origination DCSU and said termination DCSU; and sending primary signal path and secondary signal path information to said origination DCSU and said termination DCSU wherein a space-based cross-link between a primary satellite and a secondary satellite is used to coordinate the establishing of said primary signal path and the establishing of said secondary signal path.

10. The method as claimed in claim 9, wherein said method further comprises the steps of:

determining delay information for said primary signal path and secondary signal path; and sending said delay information to said origination DCSU and said termination DCSU.

11. The method as claimed in claim 9, wherein said method further comprises the step of:

establishing said primary signal path and secondary signal path using at least one terrestrial-based link and at least one space-based link.

12. A method for operating a dual-coverage subscriber unit (DCSU) to provide communication services to said DCSU in a communication system, said communication system comprising a plurality of cross-linked communication satellites, said plurality of cross-linked communication satellites using space-based cross-links for communicating with said DCSU, said method comprising the steps of:

sending a request for a dual-satellite service to a system control center via a first RF channel with a first satellite of said plurality of cross-linked communication satellites, said dual-coverage subscriber unit comprising two separate radio frequency (RF) subsystems having separate antennas, wherein said DCSU uses a first RF subsystem to establish said first RF channel;

receiving a reply to said request from said system control center via said first satellite;

establishing said dual-satellite service, said DCSU determining if said dual-satellite service is available and establishing said dual-satellite service when said dual-satellite service is available, wherein said DCSU establishes a second RF channel with a second satellite of said plurality of cross-linked communication satellites, wherein a space-based cross-link is established between said second satellite and said first satellite, and determines a primary channel and a secondary channel based on a combination of signal strength and bit error rates for said RF channels, said DCSU using a second RF subsystem to establish said second RF channel; and maintaining single-satellite service, when said dual-satellite service is not available.

13. The method as claimed in claim 12, wherein said establishing step further comprises the steps of:

determining hand-off priority for said primary channel; and determining hand-off priority for said secondary channel.

14. The method as claimed in claim 13, wherein said establishing step further comprises the steps of:

determining which frequencies to allocate to said primary channel based on signal strength; and determining which frequencies to allocate to said secondary channel also based on signal strength.

15. The method as claimed in claim 14, wherein said establishing step further comprises the steps of:

determining which timeslots to allocate to said primary channel using an expected signal delay for a primary path; and determining which timeslots to allocate to the secondary channel using an expected signal delay for a secondary path.

16. The method as claimed in claim 15, wherein said establishing step further comprises the steps of:

storing data from a certain number of timeslots; and replacing missing data packets on said primary channel with data packets from said secondary channel.

17. The method as claimed in claim 12, wherein said method further comprises the step of:

determining a location for said DCSU.

* * * * *